Nov. 21, 1944. W. R. HARDING ET AL 2,363,320
SERIES VARIABLE SPEED DRIVE
Filed Nov. 11, 1941

INVENTORS
William R. Harding and
Scott H. Hanville, Jr.

Patented Nov. 21, 1944

2,363,320

UNITED STATES PATENT OFFICE 2,363,320

SERIES VARIABLE SPEED DRIVE

William R. Harding, Murrysville, Pa., and Scott H. Hanville, Jr., Huron, Ohio, assignors to Westinghouse Electric & Manufacturing Company, East Pittsburgh, Pa., a corporation of Pennsylvania Application November 11, 1941, Serial No. 418,629

9 Claims. (Cl. 172—239)

Our invention relates to adjustable speed drives and, more particularly, to a variable voltage generator and motor drive in which the generator is a series generator without a separately or shunt excited field winding and the motor is also of the series type having the same or substantially the same frame size as the generator, and thus having a rating equal or substantially equal to that of the generator.

Our present invention includes improvements over the invention described and claimed in our pending application, entitled "Series speed control units," filed on October 19, 1940, Serial No. 361,934, now Patent No. 2,303,457, dated December 1, 1942.

Series motors are, of course, in regular use and well known to the trade, but series generators for operating motors have always been held very unsatisfactory. For instance, as one of their disadvantages such generators have a rising voltage characteristic with an increase in load current. This is usually very unsatisfactory. However, by selecting the proper values of the constants of both the generator and the motor the motor speed may be kept substantially constant for any speed setting selected, regardless of the variations in the load.

One broad object of our present invention is the provision of a substantially constant speed for a series motor energized from a series generator for all speeds selected for the motor over a wide range, regardless of variations in load on the motor coupled with the provision of increasing the torque of the motor particularly at the low speeds.

Another broad object of our invention is to provide for stable high torque operation of the series motor operated from a series generator at the low speeds.

A still further object of our invention, as hereinafter disclosed, is to provide for good speed regulation over a wide load range.

It is also an object of our invention to provide in a variable voltage drive having a series generator and a series motor, either one or the other, or both, of which have a negligible residual flux for high torques at low speeds up to the stalled motor condition.

Another object of our invention in combination with a series drive is to obtain very low speeds and to prevent creeping of the motor at standstill adjustment of the generator field rheostat.

It is also an object of our invention to provide simple and effective means for decreasing the effect of armature reaction tending to displace the current sheet.

The objects hereinbefore expressed are believed to be merely illustrative and many other objects and advantages will become apparent from a study of the following specification when considered with the drawings accompanying the specification, and in which drawings.

Figure 1:
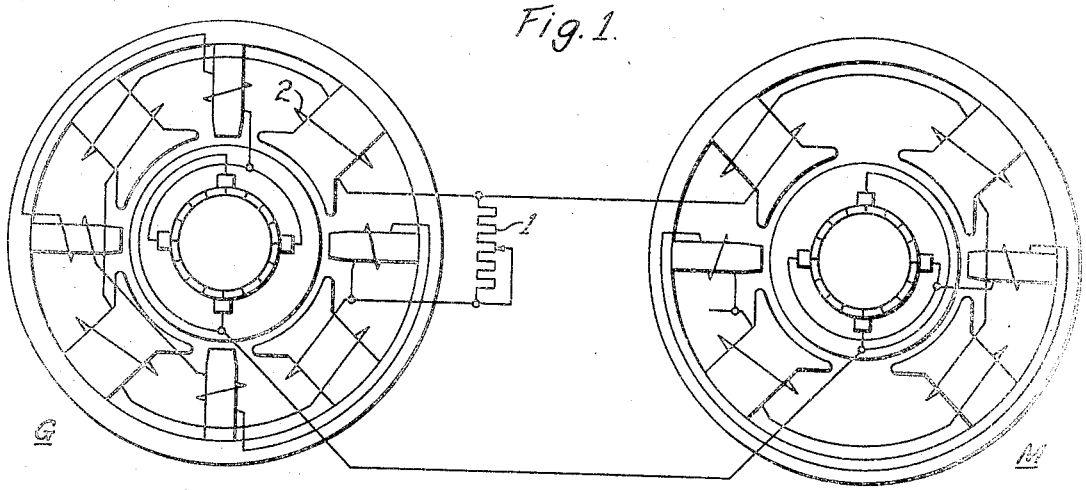
Figure 1 is a diagrammatic showing of our invention.

In Fig. 1, G designates a series generator and M designates a series motor. The two dynamo-electric machines G and M are preferably, though not necessarily, of the same frame size and thus have comparable ratings, and are otherwise preferably generally alike in structure. The generator G is driven by a suitable constant speed alternating-current motor (not shown in Fig. 1 but shown in Fig. 5) coupled to a source of alternating current in manner indicated in Fig. 5, or is driven at substantially constant speed in any other suitable manner.

In the showing in Fig. 1, we have shown the motor and the generator of the four-pole type, but it is apparent that our invention is not limited to a four-pole showing, but may include machines of a greater number of poles, as well as even two-pole machines.

The machines may, of course, include all the improvements and refinements disclosed and claimed in our pending application, as for instance the pole pieces may be provided with pole tips, with the leading end cut off, or are provided with holes drilled therethrough to reduce the no-load flux without materially reducing the full load flux and thus improve the regulation at the lower loads. These refinements, however, are no part of the present invention and, therefore, need not be disclosed in detail herein.

To improve the speed regulation, particularly at light loads, our theoretical considerations show that this could be accomplished if machines could be had that show no or zero hysteresis losses and yet were able to build up flux to produce voltage and torque. Dynamo-electric machines having no hysteresis losses are neither, as now known, possible nor desirable, because such machines could not build up flux. However, very material improvements have been obtained with existing materials by providing the machines with low residual with reference to the no-load saturation flux. This may be obtained as for instance with laminated roll steel and Bessemer sheet steel, or other irons and steels having desirable qualities, or the magnetic structure of the machines may be annealed. Machines built in accordance with our invention incorporate a magnetic structure having low residual flux, that is, the residual is less than fifteen per cent of the no-load saturation flux. The residual may be as low as four per cent of the no-load saturation flux. The preferred range is from twelve per cent of the no-load saturation flux to four per cent of the no-load saturation flux.

To eliminate some of the disadvantages of the speed characteristic of our series drive at the higher torque, we are herein disclosing a method and means for increasing the stalled rotor torque of a series motor in a series drive of this type and thus also increasing the torque at low speeds.

In Fig. 1, we show four interpoles on the generator, thereby increasing the amount of iron in the interpoles or commutating poles. This increase in the amount of iron thus prevents the operation of the interpoles or commutating poles at saturation at the currents required to produce the desired high torques at increased loads, and particularly the desired higher torques at increased loads at low speeds. The stalled motor torque is thereby increased.

It is well known that the armature reaction distorts or shifts the current sheet, and thus not only normally impairs commutation if the brushes are not shifted, but in a series drive the armature reaction will distort the field sufficiently to cause a decrease in generator voltage. By the terms current sheet we mean the effective region on the surface of the brushes of a machine at which it may be considered that the entire current flow is concentrated. This is most serious at the lower speeds. At the lower speeds, the generator field, by operation of the rheostat 1 to a low speed position, is necessarily weakened, thereby making the generator field subject to further weakening due to the armature reaction. The voltage of the generator thus decreases with a rise in load, and the motor M thus stalls much more readily. With the four interpoles we show in Fig. 1, the iron of the interpoles at no time during any practical operation becomes saturated, and the unsaturated commutating poles in the generator thus decrease the distortion effect of the armature current by preventing shifting of the current sheet. The voltage of the generator thus remains at the desired selected value, and the stalled motor torque is increased very considerably. Stated briefly, the magnetic pole structure of the interpoles is so chosen as to have a large magnetic capacity relative to the magnetic capacity of the rotor of the motor that is large enough to prevent shifting of the current sheet.

Figure 2:
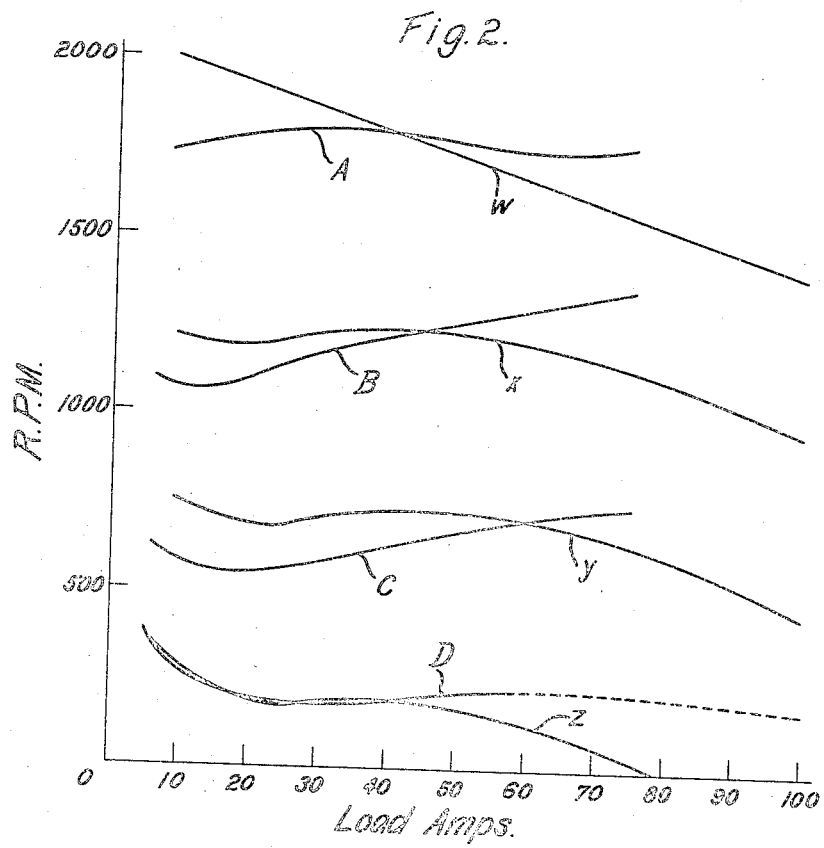
Fig. 2 shows a plurality of speed torque curves comparing the results obtained with our present invention in relation to the results obtained with the invention disclosed and claimed in the hereinbefore referred to application of ours.

In Fig. 2, we compare the speed load curve of our series drive as disclosed in the hereinbefore mentioned pending application with the contribution made by this invention. It should be noted that at the right ends of each of the curves A, B, C and D the speed is considerably higher for the same load as is the speed for the curves W, X, Y and Z. Further, it should be noted that the curves A, B, C and D have a much more nearly horizontal position than have the curves W, X, Y and Z; thus not only is the speed at the higher torques maintained, but the overall speed is maintained constant over a greater load range. This is of particular advantage for the low speeds as shown by the relation of curves D and Z. With our contribution herein made, our series drive equipment now has five to seven times full load torque when stalled after being set for operation at, for instance, one-tenth of full speed.

Figure 3:
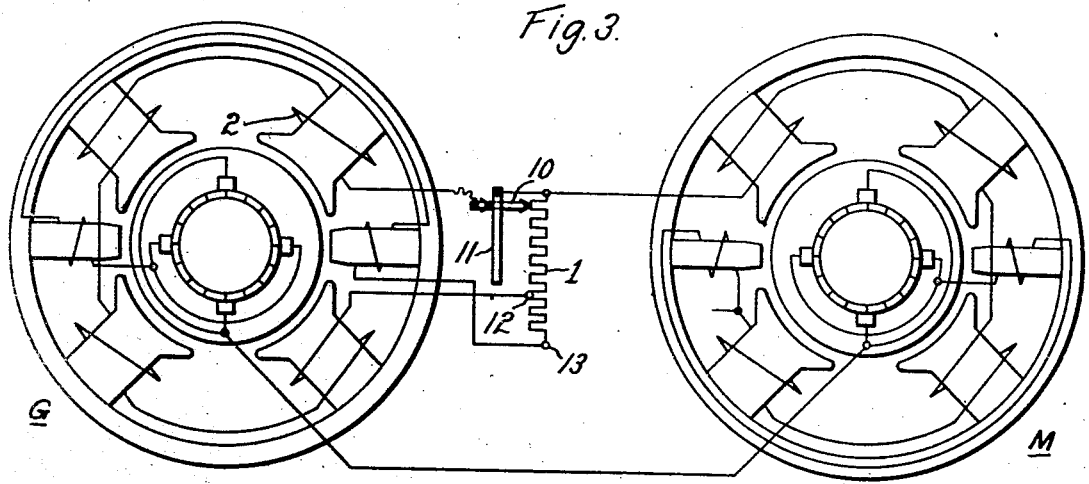
Fig. 3 is a diagrammatic showing of a modification of our invention.

To obtain the effect of increasing the stalled motor torque at the low speeds, the amount of iron in the commutating poles may also be increased by increasing the dimensions of the commutating poles. This we show in Fig. 3. In Fig. 3, only two commutating poles are shown on the generator, but the amount of iron in the pole pieces of the commutating poles is so chosen that the commutating poles do not become saturated at heavy loads and low speed operation of the motor.

In Fig. 3 we show an additional improvement in the rheostatic control. One terminal of the generator field is connected to the rheostat arm 10 which engages a conducting bar 11 and the sections of the rheostat. For the maximum generator voltage and thus maximum motor speed, the rheostat arm 10 is in the position shown. As the arm 10 is moved down more and more of the rheostat is shunted and motor speed is decreased.

Of course as thus fewer and fewer sections of the rheostat resistors are used in parallel with the field the speed regulation would be seriously affected if the bar 11 and slide arm 10 were not used. Our arrangement provides for shunting out the resistor sections no longer used so that serious droop in the speed curve is prevented.

When the arm arrives at the end of the bar 11 the resistor sections of the arm 10 are inserted in the line circuit to the motor. A moment later when the arm 10 is moved below point 12 toward point 13, the polarity on the terminals of the generator field are reversed. The residual magnetism is thus bucked down. The generator voltage due its residual flux is thus not able to cause creepage of the motor. Further, since the resistor sections of the rheostat are reinserted in the line, the residual flux is not bucked down to a point so low that the generator will not build up voltage when the arm 10 is again moved toward the upper end of the resistor sections of the rheostat.

Figure 4:
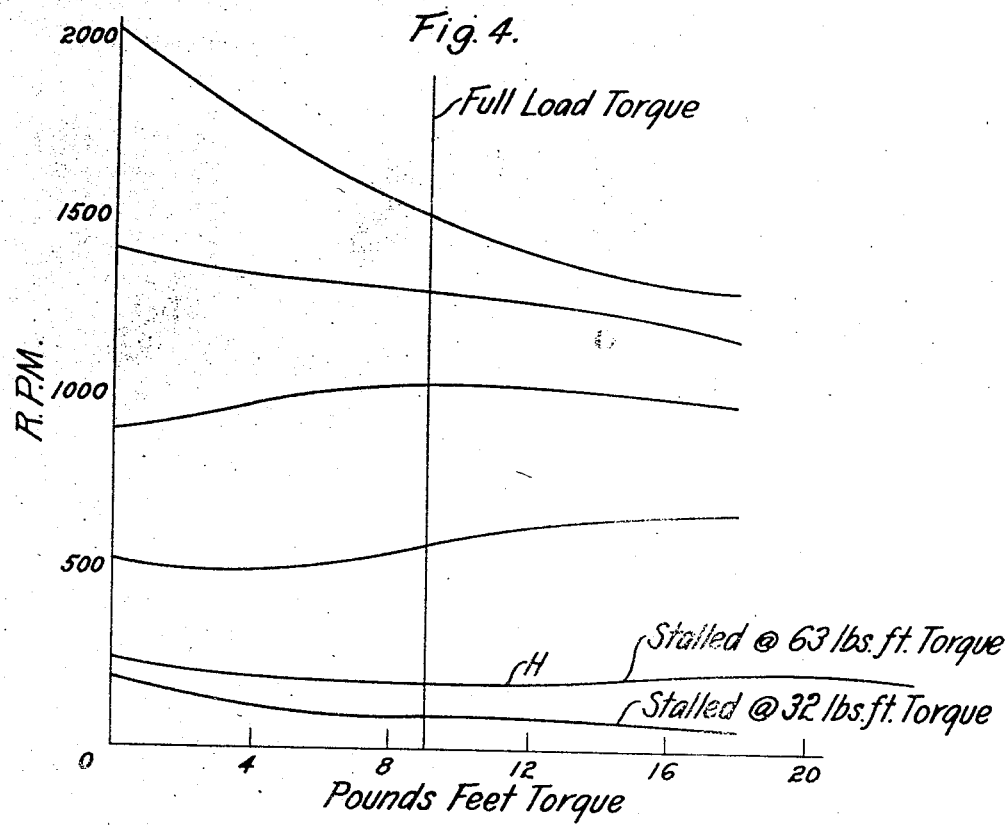
Fig. 4 is a showing of a plurality of speed torque curves for a machine of different rating than shown by the curves in Fig. 2.

In Fig. 4, a number of curves are shown which are plotted from actual test data of our invention in operation. It will be noted that the curve H is practically flat and extends out towards the right to a very high stalled motor torque.

The starting and operation may be effected by operating the starting push button 37 (see Fig. 5) which effects the operation of the line contactor 38 and thus connects the alternating-current motor 36 to the alternating-current supply buses 45, 46 and 47. To stop the system, the push button 48 is operated.

Figure 5:
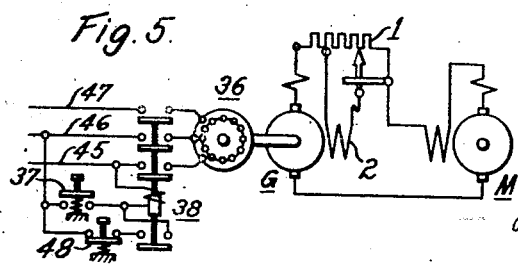
Fig. 5 shows our drive in its simplest diagrammatic form also showing the prime mover.

From the showings in Figs. 1, 3 and 5, it will be apparent that the loop circuit including the generator G and the motor M constitutes a circuit requiring no electrical contactors, and thus not only provides a smooth starting for the motor but also provides a starting control of the simplest, cheapest and most reliable arrangement for machine tool drives, and provides for constant speed operation at low speeds and high loads. During operation, the speed of the motor M is, of course, varied by shifting the position of the lead, or arm 107 on rheostat 1, which has its resistor sections disposed in shunt relation with the series field windings 2 of the generator.

While we have shown only two embodiments of our invention, we are aware that others, particularly after having had the benefit of our teaching, may devise still further circuits and other similar features. We, therefore, do not wish to be limited to the specific showing made, but wish to be limited only by the scope of the claims hereto appended.

We claim as our invention:

1. In a motor drive circuit, in combination, a series generator coupled to the motor means of the constant speed type to thus be driven at substantially constant speed, said series generator having a series field winding and a commutating field winding having a magnetic pole structure of a large magnetic capacity relative to the magnetic capacity of the rotor of the motor, a series motor connected in a loop circuit with the generator to be electrically driven thereby, said motor and generator having magnetic circuits designed to have a residual magnetism from 12% to as low as 4% of the no-load saturation flux, an adjustable resistor for controlling the current in the series field winding of the generator disposed to have a selected portion thereof connected in shunt relation to the series field winding of the generator, an adjustable lead so connected to the series field winding and the adjustable resistor that the portion not shunting the series field winding of the generator is also shunted out of the loop circuit, a portion of said adjustable resistor being so arranged in relation to the adjustable lead that at the low voltage operation of the generator the polarity on the series field winding of the generator may be reversed to buck down the residual of the generator to effectively prevent creepage of the motor, thereby stopping the motor, said mentioned large magnetic capacity of the pole structure of the commutating field winding being of such magnitude as to prevent shifting of the current sheet at low speeds to thus increase the motor torque at low speeds.

2. In a variable speed drive for a machine element, in combination, a direct-current motor for driving the machine element, said motor having a magnetic circuit designed to have a residual magnetism from 15% to as low as 4% of the no-load saturation flux, an armature winding of a series field winding and a commutating field winding connected directly in series with the motor armature winding, a direct-current series generator connected in a loop circuit with said motor to drive the said motor, said generator having substantially the same dimensions, substantially the same low residual magnetic characteristics and generally substantially the same electrical circuit connections as the motor, except that the generator commutating field winding has a magnetic circuit that is designed to have a relatively large magnetic capacity namely of such capacity as to prevent its becoming saturated at low speeds and high loads whereby the current sheet is prevented from shifting to thus obtain high torques at low motor speeds, an adjustable resistor disposed in shunt relation to the generator series field winding for controlling the speed of the motor, means for reversing the polarity on the generator series field winding at low speeds by reversing the sense of the connection of the generator series field winding with reference to said adjustable resistor to thus buck down the residual of the magnetism of the generator whereby the motor is prevented from creeping and thus is effectively stopped, and means for driving the generator at substantially constant speed.

3. In a series drive, a series generator driven at a constant speed, said series generator having an armature winding, a series field winding, a resistor for adjusting the excitation of the series field winding, said resistor having a plurality of sections all connected in series from one resistor terminal to the other resistor terminal, said generator field winding having one of its field terminals connected to the resistor intermediate the resistor terminals, nearer to the said other than to the said one of the resistor terminals and having its other field terminal disposed to be connected to any point along the resistor from the said one resistor terminal to the said other resistor terminal, a low resistance conductor having one end connected to the said one resistor terminal and disposed along the resistor toward the said other resistor terminal so that the other end of the conductor is near the connection of the one field terminal to the resistor, said conductor being arranged to electrically contact, for the length of the conductor, the other field terminal as the field terminal is moved from the one resistor terminal toward the said other resistor terminal, and a series motor of substantially the same rating connected in a loop circuit to the series generator to be electrically driven thereby.

4. In a series drive, a series generator driven at a constant speed, said series generator having an armature winding, a series field winding, a resistor for adjusting the excitation of the generator series field winding, said generator series field winding having one terminal permanently connected near one end of the resistor and the other terminal adjustable so that it may be connected at any point along the resistor from the other end of the resistor to the said one end of the resistor, and means for shunting the portion of the resistor not in parallel with the field winding and which is disposed between the other end of the resistor and the permanently connected terminal of the field winding, and a series motor of substantially the same rating connected in a loop circuit to the series generator to be electrically driven thereby.

5. In a series drive, a series generator driven at a constant speed, said series generator having an armature winding, a series field winding provided with a magnetizable pole structure designed to have a residual magnetism from 12% to as low as 4% of the no-load saturation flux of the pole structure, a resistor for adjusting the excitation of the series field winding, said resistor having a plurality of sections all connected in series from one resistor terminal to the other resistor terminal, said generator field winding having one of its field terminals connected to the resistor intermediate the resistor terminals, nearer to the other than to the one of the resistor terminals and having its other field terminal disposed to be connected to any point along the resistor from one resistor terminal to the other resistor terminal, a low resistance conductor having one end connected to the said one resistor terminal and disposed along the resistor toward its other resistor terminal so that the other end of the conductor is near the connection of the one field terminal to the resistor, said conductor being arranged to electrically contact, for the length of the conductor, the other field terminal as the field terminal is moved from the one resistor terminal toward the said other resistor terminal, and a series motor of substantially the same rating connected in a loop circuit to the series generator to be electrically driven thereby.

6. In a series drive, a series generator driven at a constant speed, said series generator having an armature winding, a series field winding, a commutating field winding having a magnetic circuit of relatively large magnetic capacity so that the iron of the magnetic circuit does not become saturated when relatively heavy currents flow through the commutating field winding whereby the armature reaction of the generator can not cause any appreciable shift in the current sheet, a resistor for adjusting the excitation of the series field winding, said resistor having a plurality of sections all connected in series from one resistor terminal to the other resistor terminal, said generator field winding having one of its field terminals connected to the resistor intermediate the resistor terminals, preferably nearer to one than to the other of the resistor terminals and having its other field terminal disposed to be connected to any point along the resistor from one resistor terminal to the other resistor terminal, a low resistance conductor having one end connected to the other resistor terminal and disposed along the resistor toward its other resistor terminal so that the other end of the conductor is near the connection of the one field terminal to the resistor, said conductor being arranged to electrically contact, for the length of the conductor, the other field terminal as the field terminal is moved from the other resistor terminal toward the said one resistor terminal, and a series motor of substantially the same rating connected in a loop circuit to the series generator to be electrically driven thereby.

7. In a series drive, a series generator driven at a constant speed, said series generator having an armature winding, a series field winding having lower than normal residual flux relative its no-load saturation flux, a magnetic circuit field winding having a magnetic circuit of relatively large magnetic capacity so that the iron of the magnetic circuit does not become saturated when relatively heavy currents flow through the commutating field winding whereby the armature reaction of the generator can not cause any appreciable shift in the current sheet, a resistor for adjusting the excitation of the series field winding, said resistor having a plurality of sections all connected in series from one resistor terminal to the other resistor terminal, said generator field winding having one of its field terminals connected to the resistor intermediate the resistor terminals, nearer to the said other than to the said one of the resistor terminals and having its other field terminal disposed to be connected to any point along the resistor from one resistor terminal to the other resistor terminal, a low resistance conductor having one end connected to the said one resistor terminal and disposed along the resistor toward its other resistor terminal so that the other end of the conductor is near the connection of the one field terminal to the resistor, said conductor being arranged to electrically contact, for the length of the conductor, the other field terminal as the field terminal is moved from the said one resistor terminal toward the said other resistor terminal, and a series motor of substantially the same rating connected in a loop circuit to the series generator to be electrically driven thereby.

8. In a series drive, a series generator driven at a constant speed, said series generator having an armature winding, a series field winding, a commutating field winding having a magnetic circuit of relatively large magnetic capacity so that the iron of the magnetic circuit does not become saturated when relatively heavy currents flow through the commutating field winding whereby the armature reaction of the generator can not cause any appreciable shift in the current sheet, a resistor for adjusting the excitation of the generator series field winding, said generator series field winding having one terminal permanently connected near one end of the resistor and the other terminal adjustable at any point along the resistor from the other end of the resistor to the said one end of the resistor, and means for shunting the portion of the resistor not in parallel with the field winding and which is disposed between the other end of the resistor and the permanently connected terminal of the field winding, and a series motor of substantially the same rating connected in a loop circuit to the series generator to be electrically driven thereby.

9. In a series drive, a series generator driven at a constant speed, said series generator having an armature winding, a series field winding having a magnetizable pole structure designed to have a residual flux of from 12% to as low as 4% of the no-load saturation flux of the pole structure, a lower than normal no-load saturation commutating field winding having a magnetic circuit of relatively large magnetic capacity so that the iron of the magnetic circuit does not become saturated when relatively heavy currents flow through the commutating field winding whereby the armature reaction of the generator can not cause any appreciable shift in the current sheet, a resistor for adjusting the excitation of the generator series field winding, said generator series field winding having one terminal permanently connected near one end of the resistor and the other terminal adjustable so that it may be connected at any point along the resistor from the other end of the resistor to the said one end of the resistor, and means for shunting the portion of the resistor not in parallel with the field winding and which is disposed between the other end of the resistor and the permanently connected terminal of the field winding, and a series motor of substantially the same rating connected in a loop circuit to the series generator to be electrically driven thereby.

WILLIAM R. HARDING.
SCOTT H. HANVILLE, Jr.